US012756261B2

(12) United States Patent
Wyler et al.

(10) Patent No.: US 12,756,261 B2
(45) Date of Patent: Oct. 6, 2026

(54) ELECTRIC MOTOR BEARING ASSEMBLY AND METHOD

(71) Applicant: MILWAUKEE ELECTRIC TOOL CORPORATION, Brookfield, WI (US)

(72) Inventors: Andrew R. Wyler, Pewaukee, WI (US); Jacob N. Zimmerman, Pewaukee, WI (US); Andrew R. Schauer, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/380,755

(22) Filed: Jul. 20, 2021

(65) Prior Publication Data

US 2022/0021266 A1 Jan. 20, 2022

Related U.S. Application Data

(60) Provisional application No. 63/053,840, filed on Jul. 20, 2020.

(51) Int. Cl.
*H02K 5/173* (2006.01)
*H02K 15/028* (2025.01)
*H02K 15/14* (2006.01)

(52) U.S. Cl.
CPC ......... *H02K 5/1732* (2013.01); *H02K 15/028* (2013.01); *H02K 15/14* (2013.01)

(58) Field of Classification Search
CPC ..... H02K 5/1732; H02K 15/028; H02K 15/14
USPC .............................................................. 310/90
See application file for complete search history.

(56) References Cited

U.S. PATENT DOCUMENTS 1,874,250 A 8/1932 Decker
1,964,797 A 7/1934 Preston
4,268,233 A 5/1981 Fernstrom
4,635,732 A 1/1987 Gotsch et al.
(Continued)

FOREIGN PATENT DOCUMENTS

DE 2340303 A1 2/1975
DE 19650428 A1 6/1998
(Continued)

OTHER PUBLICATIONS https://www.sciencedirect.com/topics/engineering/sliding-bearing, (Year: 2019).*

(Continued)

*Primary Examiner* — Terrance L Kenerly
(74) *Attorney, Agent, or Firm* — Michael Best & Friedrich LLP

(57) ABSTRACT

An electric motor including a stator, a rotor that is at least partially received within the stator and that has a rotor shaft, and a bearing. The bearing has an inner race that is coupled to the rotor shaft, and an outer race. The motor also includes a bearing mount that has a pocket in which the outer race is at least partially received, and a clamp assembly that is configured to apply a clamping force to the inner race and to thereby rotationally unitize the inner race with the rotor shaft. An interface element positioned is between the outer race and the bearing mount. The interface element is configured to apply a frictional force to the outer race to prevent rotation of the outer race relative to the bearing mount in response to rotation of the rotor shaft.

21 Claims, 4 Drawing Sheets

(56) References Cited

U.S. PATENT DOCUMENTS

| | | | | |
|---|---|---|---|---|
| 6,394,191 | B1 | 5/2002 | Nakane | |
| 8,893,847 | B2 * | 11/2014 | Imanishi | B62D 5/0448 180/443 |
| 2004/0027117 | A1 | 2/2004 | Spingler | |
| 2005/0188498 | A1 | 9/2005 | Thanner et al. | |
| 2006/0163955 | A1 | 7/2006 | Maruyama et al. | |
| 2009/0298630 | A1 | 12/2009 | Mineno et al. | |
| 2011/0068646 | A1 * | 3/2011 | Terakubo | H02K 3/325 310/71 |
| 2014/0072459 | A1 | 3/2014 | Kalavsky | |
| 2016/0049837 | A1 * | 2/2016 | Helbling | H02K 1/30 310/156.22 |
| 2020/0119600 | A1 * | 4/2020 | Inuzuka | H02K 7/145 |

FOREIGN PATENT DOCUMENTS

| | | | | |
|---|---|---|---|---|
| EP | 2119923 | A1 | 11/2009 | |
| FR | 2472690 | A1 * | 7/1981 | F16C 35/063 |
| WO | 2004099622 | A1 | 11/2004 | |

OTHER PUBLICATIONS

International Search Report and Written Opinion for Application No. PCT/US2021/042357 dated Nov. 11, 2021 (10 pages).

Extended European Search Report for Application No. 21845250.6 dated Jul. 1, 2024 (10 pages).

* cited by examiner

ELECTRIC MOTOR BEARING ASSEMBLY AND METHOD

CROSS-REFERENCE TO RELATED APPLICATIONS

This application claims priority to U.S. Provisional Patent Application No. 63/053,840, filed on Jul. 20, 2020, and entitled "Electric Motor Bearing Assembly and Method", the contents of each of which is hereby incorporated by reference in its entirety.

FIELD OF THE INVENTION

The present invention relates to electric motors, and more particularly to electric motor bearing assemblies and methods of assembling motors.

BACKGROUND OF THE INVENTION

Electric motors, such as those used in power tools, typically include a stator assembly and a rotor rotatably supported relative to the stator assembly by multiple bearings. Brushless direct current (BLDC) motors typically also include a printed circuit board as part of the stator assembly having Hall-effect sensors to detect the rotational position of the rotor relative to the stator assembly. The bearings are usually press-fit onto the rotor, making damage to the printed circuit board possible.

SUMMARY OF THE INVENTION

In one embodiment, the invention relates to an electric motor including a stator, a rotor that is at least partially received within the stator and that has a rotor shaft, and a bearing. The bearing has an inner race that is coupled to the rotor shaft, and an outer race. The motor also includes a bearing mount that has a pocket in which the outer race is at least partially received, and a clamp assembly that is configured to apply a clamping force to the inner race and to thereby rotationally unitize the inner race with the rotor shaft. An interface element positioned is between the outer race and the bearing mount. The interface element is configured to apply a frictional force to the outer race to prevent rotation of the outer race relative to the bearing mount in response to rotation of the rotor shaft.

In another independent embodiment, the invention relates to a method of assembling a motor is provided. The method may generally include rotationally supporting a first end of a rotor within a housing to thereby cantilever the rotor relative to the housing. The method includes positioning a stator assembly, including a stator and a printed circuit board attached to an end of the stator, along the rotor such that an opposite, second end of the rotor protrudes from the stator assembly. The method includes sliding an inner race of a bearing along a rotor shaft proximate the second end of the rotor. The method includes clamping the inner race to the rotor shaft to thereby rotationally unitize the inner race with the rotor shaft. The method includes sliding a bearing mount over an outer race of the bearing, the bearing mount including an interface element configured to apply a frictional force to the outer race to prevent rotation of the outer race relative to the bearing mount. The method includes securing the bearing mount to one of the housing or the stator assembly.

Other aspects of the disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
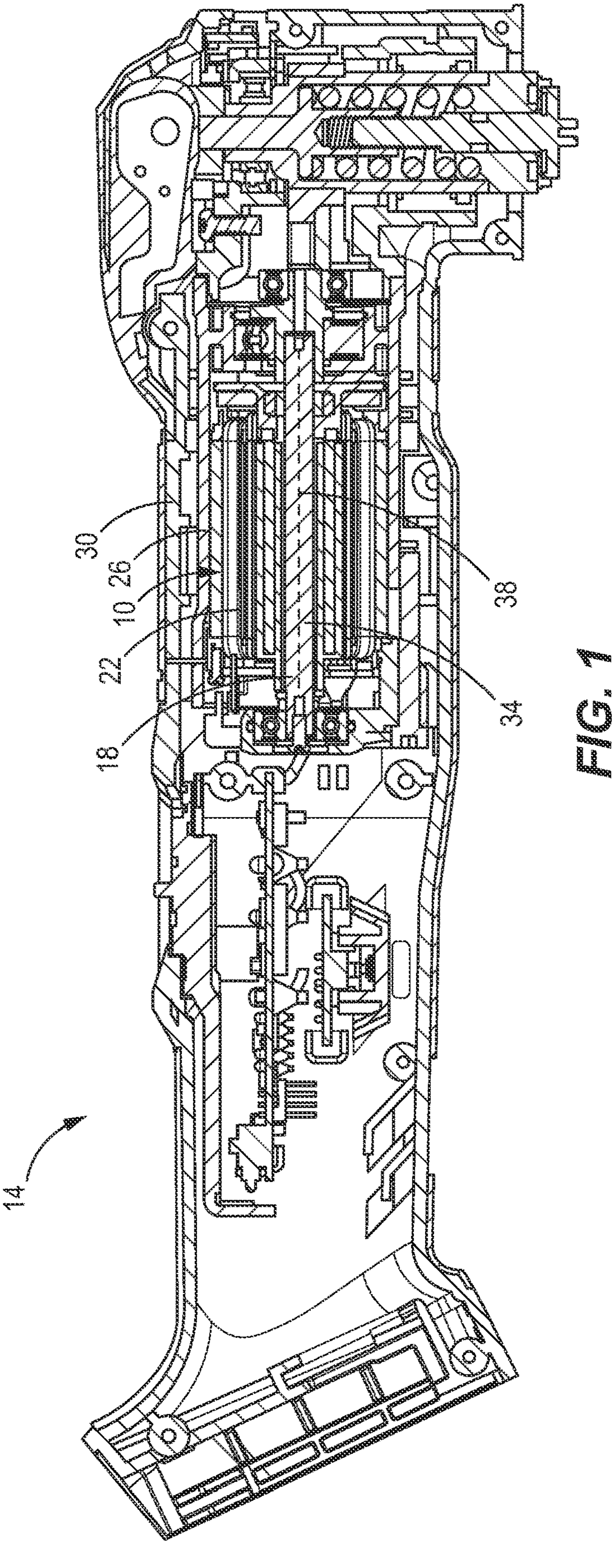
FIG. 1 is a longitudinal cross-sectional view of a power tool including an electric motor in accordance with an embodiment of the present invention.

FIG. 1 illustrates an electric motor 10 for use in a power tool 14. The power tool 14 may be, but is not limited to, an oscillating multi-tool as illustrated in FIG. 1. The motor 10 includes a rotor 18 and a stator assembly 22. In the illustrated embodiment, the motor 10 is positioned within a motor housing 26 which, in turn, is supported within a clamshell housing 30 of the power tool 14. However, in alternative embodiments, the motor 10 may be directly supported by the clamshell housing 30 without the intermediate motor housing 26. Also, in the illustrated embodiment of the motor 10, the stator assembly 22 is positioned radially outward relative to the rotor 18. Other arrangements wherein the stator assembly 22 is positioned radially inward relative to the rotor 18 may be possible. The rotor 18 includes a rotor shaft 34 defining a longitudinal axis 38.

Figure 2:
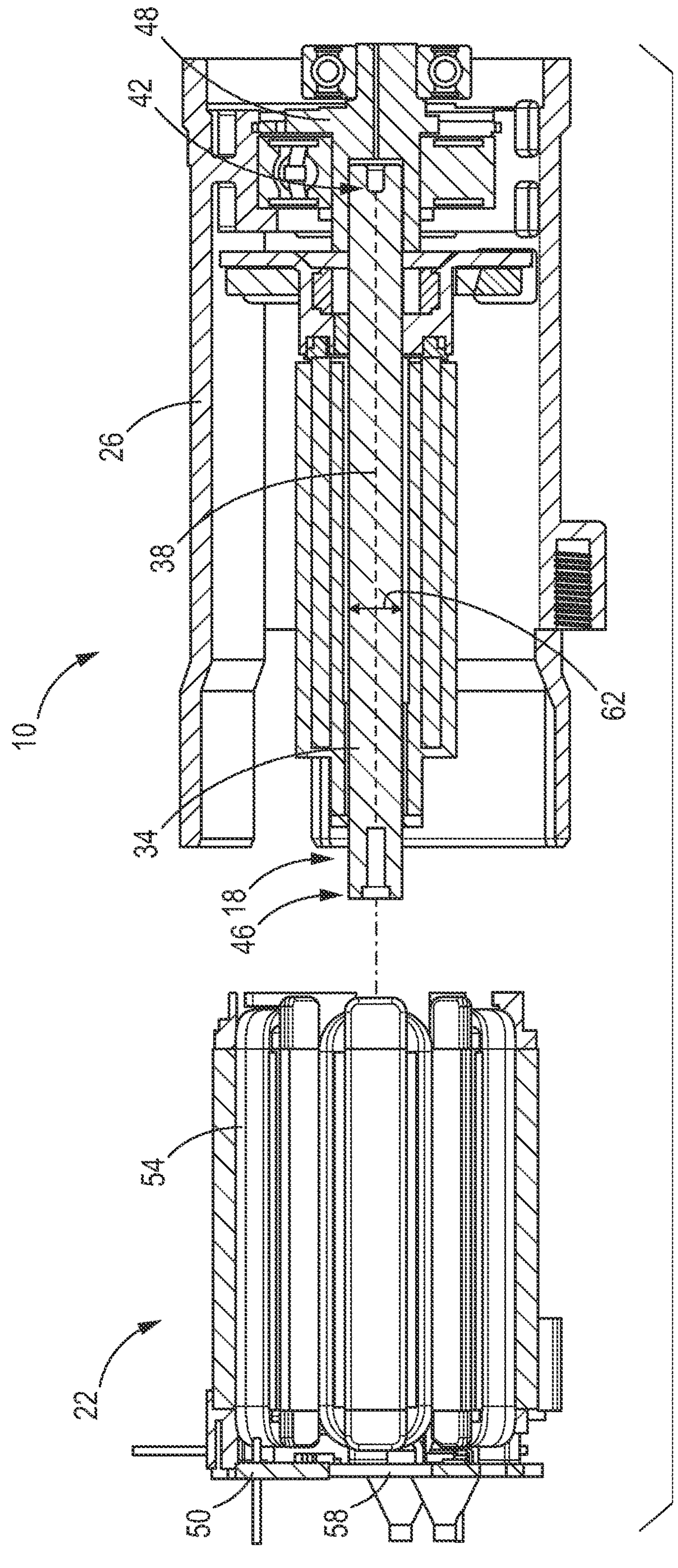
FIG. 2 is a longitudinal cross-sectional exploded view of the electric motor in the power tool of FIG. 1.

FIG. 2 illustrates the stator assembly 22 exploded from the rotor 18 prior to the assembly of the motor 10. The rotor 18 includes a front end 42 and a rear end 46. The front end 42 of the rotor 18 engages a rotor receptacle 48. The rotor shaft 34 may be press fit or fastened to the rotor receptacle 48 to unitize the rotor shaft 34 with the rotor receptacle 48. As such, the rotor receptacle 48 rotationally supports the rotor shaft 34 within the motor housing 26. The rotor receptacle 48 cantilevers the rear end 46 of the rotor 18 within the motor housing 26. In the illustrated embodiment, the motor 10 is configured as a brushless direct current (BLDC) motor 10 including a printed circuit board 50 attached to a stator 54 of the stator assembly 22. The printed circuit board 50 includes a hole 58 sized to correspond closely to an outer diameter 62 of the rotor shaft 34 such that the stator assembly 22 can be translated along the longitudinal axis 38 to a position at least partially radially intersecting the rotor shaft 34 where the rotor 18 is received within the stator 54.

Figure 4:
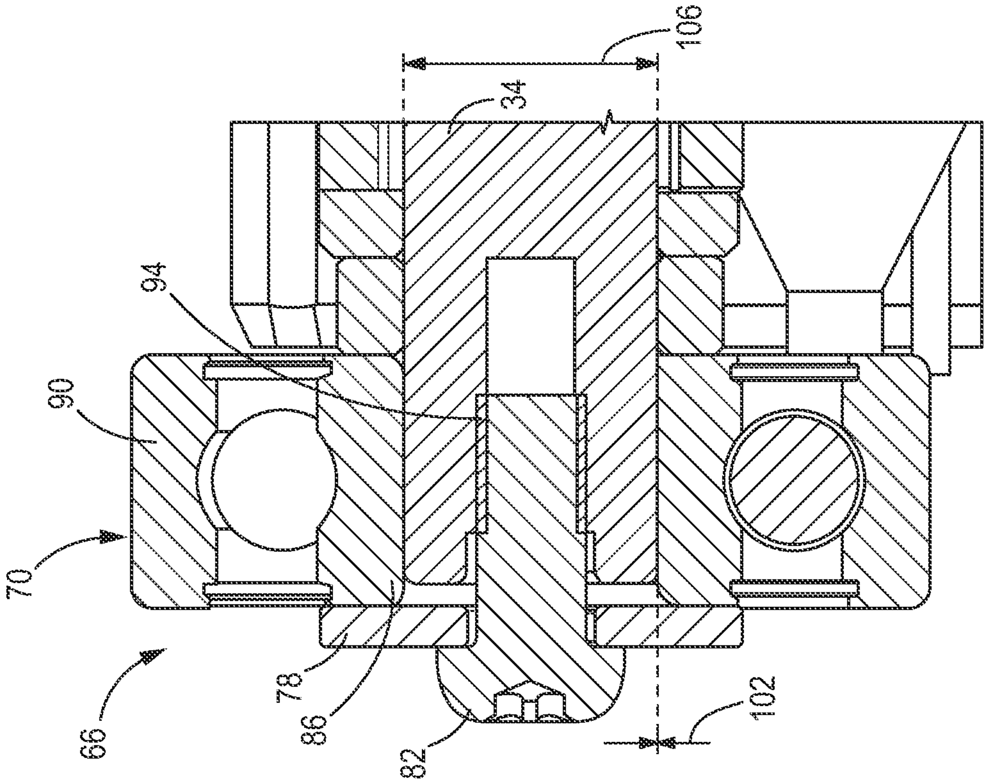
FIG. 4 is a longitudinal cross-sectional assembled view of the portion of the electric motor of FIG. 3.
Figure 3:
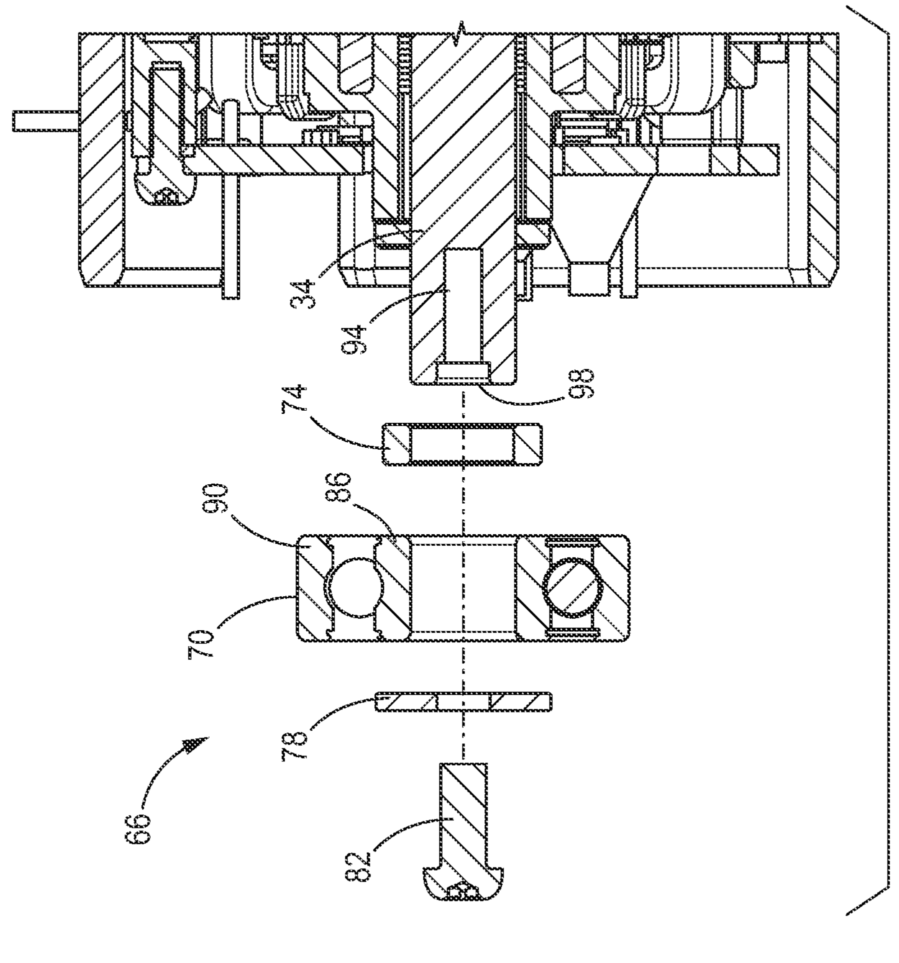
FIG. 3 is a longitudinal cross-sectional exploded view of a portion of the electric motor of FIG. 1.

FIG. 3 illustrates an exploded view of a bearing assembly 66 that rotationally supports the rear end 46 of the rotor shaft 34 relative to the stator assembly 22. The bearing assembly 66 includes a bearing 70, a spacer bushing 74, a washer 78, and a threaded fastener 82. The bearing 70 has a first (i.e., inner) race 86 and a second (i.e., outer) race 90. The rotor shaft 34 includes a threaded bore 94, located at an end face 98 of the rotor shaft 34 adjacent the rear end 46 of the rotor 18 and extending along the longitudinal axis 38, in which the fastener 82 is received. As shown in FIG. 4, a radial clearance 102 exists between an inner diameter 106 of the bearing 70 (of the inner race 86, in particular) and the rotor shaft 34. As such, the inner race 86 of the bearing 70 may be slidably inserted on the rotor shaft 34 during assembly of the motor 10 without substantial resistance. To eliminate potential slip, the inner race 86 is clamped to the rotor shaft 34 by the spacer bushing 74, the washer 78, and the fastener 82, thereby rotationally unitizing the inner race 86 with the rotor shaft 34 and axially securing the bearing 70 along the longitudinal axis 38 of the rotor shaft 34. In particular, the inner race 86 is positioned between the spacer bushing 74 and the washer 78, and the fastener 82 is threaded to the rotor shaft 34 via the threaded bore 94, which applies an axial clamping force to the inner race 86 via the washer 78.

Figure 5:
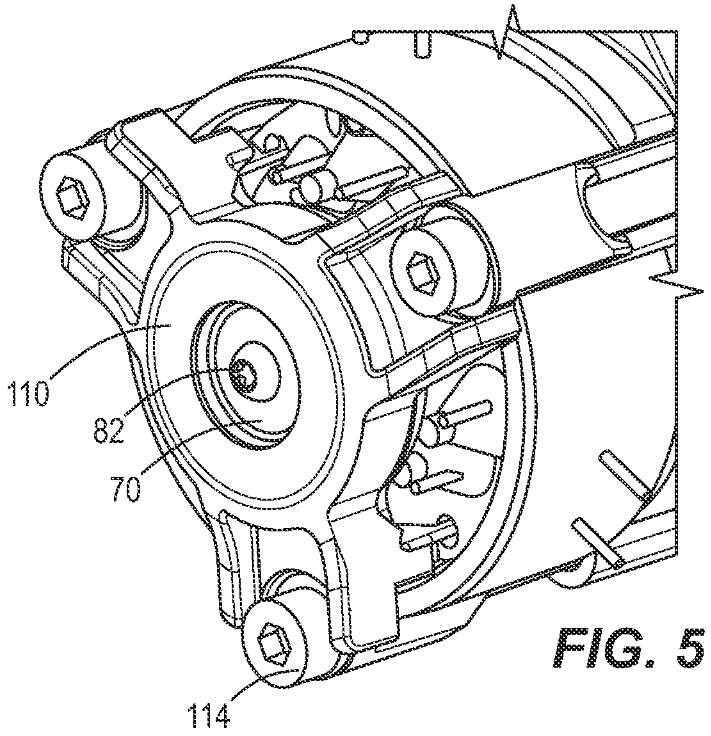
FIG. 5 is a rear perspective view of the electric motor of FIG. 1.
Figure 6:
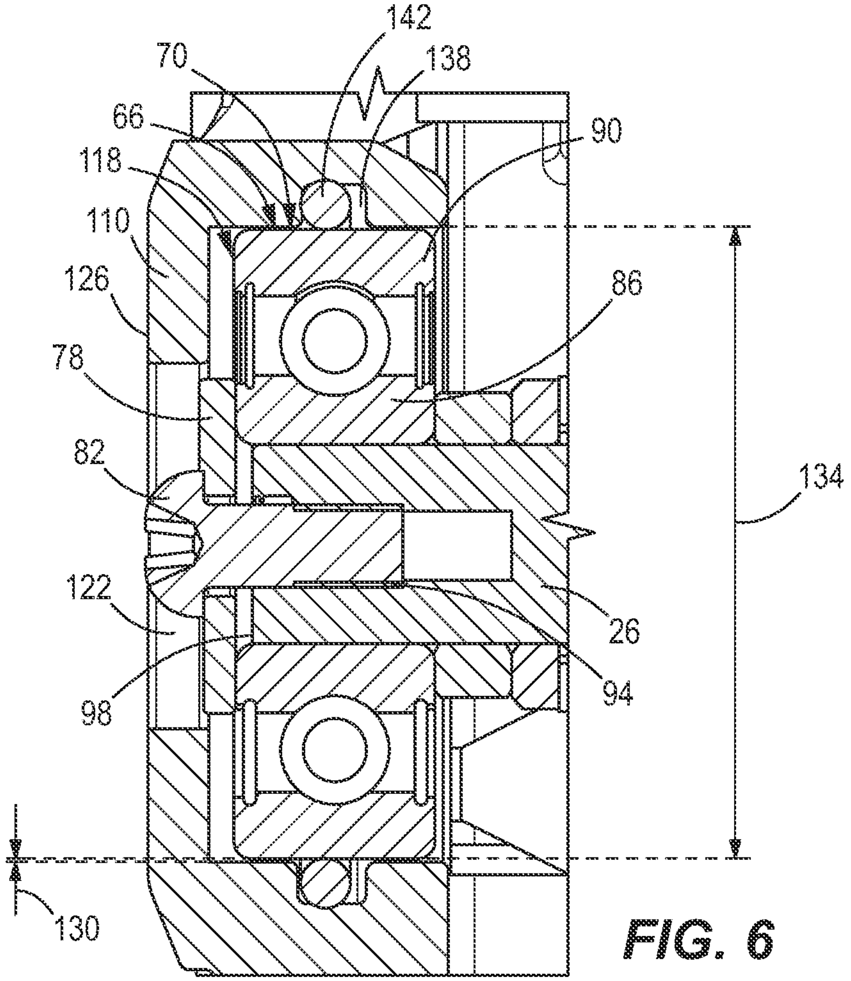
FIG. 6 is a longitudinal cross-sectional view of the portion of the electric motor shown in FIG. 5.

With reference to FIGS. 5 and 6, the motor 10 also includes a bearing mount 110 in which the bearing 70 is received. The bearing mount 110 is translated to a position in which the bearing mount 110 at least partially intersects the bearing 70 in a direction extending radially outward from the longitudinal axis 38. The bearing mount 110 is fixed to one of the motor housing 26 or the stator assembly 22 by fasteners 114. The fasteners 114 extend parallel to the longitudinal axis 38 in the illustrated embodiment. The bearing mount 110 includes a pocket 118 in which the outer race 90 of the bearing 70 is received. The bearing mount 110 also includes a hole 122 in a rear face 126 thereof. The hole 122 provides access for a user to engage the fastener 82 without removing the bearing mount 110 from the stator assembly 22 or the motor housing 26.

A radial clearance 130 exists between the outer diameter 90 of the bearing 70 (of the outer race 90, in particular) and the pocket 118. As a result, the outer race 90 of the bearing 70 may be slidably inserted within the pocket 118 during assembly of the motor 10 without substantial resistance. With reference to FIG. 6, the bearing mount 110 includes an inner groove 138 extending around the inner circumference of the pocket 118. An interface element 142 (e.g., illustrated as an O-ring in FIG. 6) is positioned in the groove 138. The interface element 142 can be metallic or non-metallic and can take different forms (e.g., in the form of the O-ring, one or more rubber slugs, one or more rubber bands, or a tolerance ring, etc.) that extends radially inward from the groove 138 to engage the outer race 90. In other words, the interface element 142 is positioned between the bearing 46 and the bearing mount 110 in a direction extending radially outward from the longitudinal axis 38. The interface element 142 provides frictional force to retain the outer race 90 stationary relative to the mount 110, and thus relative to the stator assembly 22 and the motor housing 26. As such, the interface element 142 prevents slipping and wear between the bearing 70 and the bearing mount 110.

Assembly of the motor 10 provides for locating the bearing 70 on the rotor shaft 34 without placing excessive force on the printed circuit board 50 mounted on the stator 54. The motor 10 is assembled by rotationally supporting the front end 42 of the rotor 18 within the motor housing 26 to cantilever the rotor 18 relative to the motor housing 26. The stator assembly 22 is positioned along the rotor 18 such that the rear end 46 of the rotor 18 protrudes from the stator assembly 22 in a direction along the longitudinal axis 38.

The spacer bushing 74 is then positioned on the end of the rotor shaft 34, and the bearing 70 is slid along the rotor shaft 34 proximate the rear end 46 of the rotor 18. In the illustrated embodiment, the inner race 86 is slid along the rotor shaft 34. The inner race 86 is clamped to the rotor shaft 34 to rotationally unitize the inner race 86 with the rotor shaft 34. That is, the inner race 86 is clamped to the rotor shaft 34 so that the rotor shaft 34 and the inner race 86 rotate together. The inner race 86 is clamped to the rotor shaft 34 by placing the washer 74 on the outer side of the bearing 70, and applying an axial clamping force to the inner race 86 by tightening the fastener 82 in the threaded bore 94 of the rotor shaft 34. The bearing mount 110 is slid over the outer race 90 of the bearing 70 with the interface element 142 disposed in the annular groove 138. The bearing mount 110 can be secured to the motor housing 26 or the stator assembly 22. The interface element 142 is frictionally engaged with the outer race 90 after assembly and applies a frictional force to the outer race 90 to prevent rotation of the outer race 90 relative to the bearing mount 110. The inner race 86 is rotatable with the rotor shaft 34 after the fastener 82 is tightened.

It will be appreciated that the clamping force applied to the bearing 70 (as illustrated, to the inner race 86) may be done before or after the bearing mount 110 is attached to the stator assembly 22 or the motor housing 26 due to the hole 122. In one example, the bearing 70 may be clamped prior to sliding the bearing mount 110 over the outer race 90. In another example, the bearing 70 may be clamped after sliding the bearing mount 110 over the outer race 90 (e.g., before or after the bearing mount 110 is attached to the stator assembly 22 or the motor housing 26).

Although the invention has been described in detail with reference to certain preferred embodiments, variations and modifications exist within the scope and spirit of one or more independent aspects of the invention as described.

Various features and advantages of the invention are set forth in the following claims.

The invention claimed is:

1. An electric motor comprising:

a stator;

a rotor at least partially received within the stator, the rotor including a rotor shaft;

a bearing including an inner race coupled to the rotor shaft and an outer race;

a bearing mount including a pocket in which the outer race is at least partially received;

a clamp assembly configured to apply a clamping force to the inner race to thereby rotationally unitize the inner race with the rotor shaft;

an interface element positioned between the outer race and the bearing mount, the interface element configured to apply a frictional force to the outer race to prevent rotation of the outer race relative to the bearing mount in response to rotation of the rotor shaft; and a radial clearance defined between an inner diameter of the bearing and the rotor shaft after the clamp assembly rotationally unitizes the inner race with the rotor shaft.

2. The electric motor of claim 1, wherein the clamp assembly includes a spacer bushing positioned between the rotor and the bearing, a washer engaged with an outer axial end of the bearing, and a fastener extending through the washer, the bearing, and the spacer bushing and attached to the rotor shaft.

3. The electric motor of claim 1, further comprising a second radial clearance defined between an outer diameter of the bearing and the bearing mount, wherein the interface element is engaged with the bearing and with the bearing mount.

4. The electric motor of claim 3, wherein the bearing mount further includes an annular groove in communication with the pocket, and wherein the interface element is disposed in the annular groove and extends radially inward to engage the bearing.

5. The electric motor of claim 4, wherein the interface element includes an O-ring.

6. The electric motor of claim 1, further comprising a second radial clearance defined between an outer diameter of the bearing and the bearing mount.

7. The electric motor of claim 1, wherein the bearing mount further includes an annular groove in communication with the pocket, and wherein the interface element is disposed in the annular groove and extends radially inward to engage the bearing.

8. The electric motor of claim 1, further comprising a motor housing, wherein the bearing mount is fixed to the motor housing or the stator.

9. The electric motor of claim 1, wherein the clamp assembly includes a washer engaged with an outer axial end of the bearing, and a fastener extending through the washer and the bearing and attached to the rotor shaft.

10. The electric motor of claim 9, wherein the bearing mount is coupled to the stator or a motor housing and includes a hole configured to provide access to the fastener without removal of the bearing mount.

11. The electric motor of claim 10, wherein the hole is further configured to provide access to the washer.

12. The electric motor of claim 1, wherein the rotor shaft extends along a longitudinal axis, the inner race extends an axial length parallel to the longitudinal axis, and the radial clearance is defined along at least a majority of the axial length.

13. A method of assembling an electric motor, the method comprising:

rotationally supporting a first end of a rotor within a housing to thereby cantilever the rotor relative to the housing;

positioning a stator assembly, including a stator and a printed circuit board attached to an end of the stator, along the rotor such that an opposite, second end of the rotor protrudes from the stator assembly;

sliding a bearing along a rotor shaft proximate the second end of the rotor, the bearing including an inner race and an outer race, the inner race of the bearing permitted to slide along the rotor shaft due to a radial clearance defined between an inner diameter of the inner race and the rotor shaft;

clamping the inner race to the rotor shaft to thereby rotationally unitize the inner race with the rotor shaft with the radial clearance present between the inner race and the rotor shaft;

sliding a bearing mount over the outer race, the bearing mount including an interface element configured to apply a frictional force to the outer race to prevent rotation of the outer race relative to the bearing mount; and securing the bearing mount to one of the housing or the stator assembly.

14. The method of claim 13, wherein the sliding step occurs before the clamping step.

15. The method of claim 13, spacing the bearing from the rotor using a spacer bushing.

16. The method of claim 13, wherein the clamping step includes positioning a washer on an outer side of the bearing and securing a fastener to the rotor through the washer and the bearing.

17. The method of claim 16, the method further comprising accessing the fastener via a hole in the bearing mount.

18. The method of claim 17, the method further comprising accessing the washer via the hole.

19. The method of claim 13, the method further comprising placing the interface element in an annular groove in the bearing mount.

20. An electric motor comprising:

a stator;

a rotor at least partially received within the stator, the rotor including a rotor shaft;

a bearing including an inner race coupled to the rotor shaft and an outer race;

a bearing mount including a pocket in which the outer race is at least partially received;

a clamp assembly configured to apply a clamping force to the inner race to thereby rotationally unitize the inner race with the rotor shaft; and an interface element positioned between the outer race and the bearing mount, the interface element configured to apply a frictional force to the outer race to prevent rotation of the outer race relative to the bearing mount in response to rotation of the rotor shaft, a first radial clearance defined between an inner diameter of the bearing and the rotor shaft, the first radial clearance configured to permit sliding of the bearing along the rotor shaft, the first radial clearance present after the clamp assembly rotationally unitizes the inner race with the rotor shaft; and a second radial clearance defined between an outer diameter of the bearing and the bearing mount.

21. The method of claim 13, wherein sliding the bearing includes sliding the bearing along a longitudinal axis of the rotor shaft, the inner race extending an axial length parallel to the longitudinal axis, wherein upon sliding the bearing, the radial clearance is defined between the inner race of the bearing and the rotor shaft along at least a majority of the axial length.

* * * * *